(12) United States Patent  (10) Patent No.: US 7,460,921 B2
Sullivan et al.  (45) Date of Patent: Dec. 2, 2008

(54) DYNAMIC MARKING SYSTEM

(75) Inventors: Chris Sullivan, Keene, NH (US); Simon Starkey, Ashby de la Zouch (GB); James Cupit, Nottingham (GB); Jacob Harris, Swanzey, NH (US)

(73) Assignee: Markem Corporation, Keene, NH (US)

( * ) Notice: Subject to any disclaimer, the term of this patent is extended or adjusted under 35 U.S.C. 154(b) by 292 days.

(21) Appl. No.: 10/951,418

(22) Filed: Sep. 28, 2004

(65) Prior Publication Data

US 2006/0075329 A1 Apr. 6, 2006

(51) Int. Cl.
    *G06F 19/00* (2006.01)
(52) U.S. Cl. ........................ 700/119; 264/401
(58) Field of Classification Search ............. 700/119, 700/120, 83; 264/401, 482; 400/120; 347/37, 347/19; 715/507; 53/131.2
    See application file for complete search history.

(56) References Cited

U.S. PATENT DOCUMENTS 4,705,588 A * 11/1987 Treiber ................. 53/441
6,342,949 B1 * 1/2002 Terajima ............... 358/1.13
6,420,790 B1 * 7/2002 Koizumi ................. 257/787
6,738,156 B1 * 5/2004 Simpson et al. ......... 358/1.15
2001/0002574 A1 * 6/2001 Miyazaki ................ 101/35
2002/0091724 A1 * 7/2002 Yokoe ................... 707/500
2004/0000744 A1 * 1/2004 Grigg et al. ............ 264/401
2004/0104361 A1 * 6/2004 Guldi et al. ......... 250/559.36
2005/0162697 A1 * 7/2005 Kiwada ................. 358/1.18

OTHER PUBLICATIONS

Communication from a foreign patent office in a counterpart foreign application (Search Report and Written Opinion of the International Searching Authority from PCT/US05/34703, dated Jan. 5, 2007).

* cited by examiner

*Primary Examiner*—Kidest Bahta
(74) *Attorney, Agent, or Firm*—Fish & Richardson P.C.

(57) ABSTRACT

A method and associated software and a system for automatic package marking makes use of specification of an image for a package. The specification includes specifications of data fields for marking on a package. Data values for the data fields are received from multiple data sources. Images are formed based on the received data values and the specification of the image.

14 Claims, 15 Drawing Sheets

Static Text: MARKEM

Data Field (yr) 04

Machine Code: XXXXXXXX

Merged Field: MARKEM04

Code 39:

```
file: IDM_Image_Complex.idf

<!--Written by Composer 2004 V1.0.0.0-->
<Legend type="Image.V1" PaperColor="White" BackgroundColor="LightGray">
   <DeviceInfo DeviceURI="NGEDriver[Common]/">
      <DeviceName>SmartDate S (Common)</DeviceName>
   </DeviceInfo>
   <Description/>
   <Mirrored>false</Mirrored>
   <Orientation>DEG_0</Orientation>
   <Width>5300</Width>
   <Height>7500</Height>
   <FieldList>
      <AlphaNumeric type="AlphaNum.V1">
         <Name>TEXT_1</Name>
         <ID>1</ID>
         <Geometry>
            <X>250</X>
            <Y>500</Y>
            <Rotation>0</Rotation>
         </Geometry>
         <FieldColor>BLACK</FieldColor>
         <Logged>false</Logged>
         <Text type="TextBased.V1">
            <Inverted>false</Inverted>
            <OverlayMode>MERGE</OverlayMode>
            <Font type="Font.V1">
               <Typeface>Arial</Typeface>
               <CharHeight>400</CharHeight>
               <CharWidth>181</CharWidth>
               <Filename/>
            </Font>
         </Text>
         <Static type="StaticSrc.V1">
            <AppInfo>
               <PropertyBag type="PropertyBag.V1">
                  <Item>
                     <Key>DataSource.PerJobData</Key>
                     <Value type="PerJobData.V1">
                        <PropertyMap/>
                     </Value>
                  </Item>
               </PropertyBag>
```

```xml
        </AppInfo>
        <Text>Static-Text:</Text>
      </Static>
    </AlphaNumeric>
    <AlphaNumeric·type="AlphaNum.V1">
      <Name>TEXT_2</Name>
      <ID>2</ID>
      <Geometry>
        <X>3000</X>
        <Y>1750</Y>
        <Rotation>0</Rotation>
      </Geometry>
      <FieldColor>BLACK</FieldColor>
      <Logged>false</Logged>
      <Text·type="TextBased.V1">
        <Inverted>false</Inverted>
        <OverlayMode>MERGE</OverlayMode>
        <Font·type="Font.V1">
          <Typeface>Arial</Typeface>
          <CharHeight>501</CharHeight>
          <CharWidth>225</CharWidth>
          <Filename/>
        </Font>
      </Text>
      <TimeDate·type="TimeDateSrc.V1">
        <AppInfo>
          <PropertyBag·type="PropertyBag.V1">
            <Item>
              <Key>DataSource.PerJobData</Key>
              <Value·type="PerJobData.V1">
                <PropertyMap/>
              </Value>
            </Item>
          </PropertyBag>
        </AppInfo>
        <TDFormatString>XY[0,2,2,0]</TDFormatString>
        <LanguageValue>ENGLISH</LanguageValue>
        <OffsetRule>
          <OffsetDays>0</OffsetDays>
          <OffsetMonths>0</OffsetMonths>
          <OffsetYears>0</OffsetYears>
          <OffsetHours>0</OffsetHours>
          <PromptingBehaviour>PROMPT_YY_MM_DD</PromptingBehaviour>
```

```xml
          </OffsetRule>
        </TimeDate>
      </AlphaNumeric>
      <AlphaNumeric type="AlphaNum.V1">
        <Name>TEXT_3</Name>
        <ID>3</ID>
        <Geometry>
          <X>2750</X>
          <Y>2750</Y>
          <Rotation>0</Rotation>
        </Geometry>
        <FieldColor>BLACK</FieldColor>
        <Logged>false</Logged>
        <Text type="TextBased.V1">
          <Inverted>false</Inverted>
          <OverlayMode>MERGE</OverlayMode>
          <Font type="Font.V1">
            <Typeface>Arial</Typeface>
            <CharHeight>501</CharHeight>
            <CharWidth>250</CharWidth>
            <Filename/>
          </Font>
        </Text>
        <MachineSetting type="MachineSetting.V1">
          <AppInfo>
            <PropertyBag type="PropertyBag.V1">
              </Item>
                <Key>DataSource.PerJobData</Key>
                <Value type="PerJobData.V1">
                  <PropertyMap/>
                </Value>
              </Item>
            </PropertyBag>
          </AppInfo>
          <Name>LineID</Name>
        </MachineSetting>
      </AlphaNumeric>
      <AlphaNumeric type="AlphaNum.V1">
        <Name>TEXT_4</Name>
        <ID>4</ID>
        <Geometry>
          <X>2500</X>
          <Y>500</Y>
```

FIG. 7C

```xml
                    <Rotation>0</Rotation>
                </Geometry>
                <FieldColor>BLACK</FieldColor>
                <Logged>false</Logged>
                <Text type="TextBased.V1">
                    <Inverted>false</Inverted>
                    <OverlayMode>MERGE</OverlayMode>
                    <Font type="Font.V1">
                        <Typeface>Arial</Typeface>
                        <CharHeight>437</CharHeight>
                        <CharWidth>278</CharWidth>
                        <Filename/>
                    </Font>
                </Text>
                <Static type="StaticSrc.V1">
                    <AppInfo>
                        <PropertyBag type="PropertyBag.V1">
                            <Item>
                                <Key>DataSource.PerJobData</Key>
                                <Value type="PerJobData.V1">
                                    <PropertyMap/>
                                </Value>
                            </Item>
                        </PropertyBag>
                    </AppInfo>
                    <Text>MARKEM</Text>
                </Static>
            </AlphaNumeric>
            <AlphaNumeric type="AlphaNum.V1">
                <Name>TEXT_5</Name>
                <ID>5</ID>
                <Geometry>
                    <X>250</X>
                    <Y>1750</Y>
                    <Rotation>0</Rotation>
                </Geometry>
                <FieldColor>BLACK</FieldColor>
                <Logged>false</Logged>
                <Text type="TextBased.V1">
                    <Inverted>false</Inverted>
                    <OverlayMode>MERGE</OverlayMode>
                    <Font type="Font.V1">
                        <Typeface>Arial</Typeface>
```

FIG. 7D

```xml
                <CharHeight>400</CharHeight>
                <CharWidth>180</CharWidth>
                <Filename/>
            </Font>
        </Text>
        <Static type="StaticSrc.v1">
            <AppInfo>
                <PropertyBag type="PropertyBag.V1">
                    <Item>
                        <Key>DataSource.PerJobData</Key>
                        <Value type="PerJobData.V1">
                            <PropertyMap/>
                        </Value>
                    </Item>
                </PropertyBag>
            </AppInfo>
            <Text>Date Field (yr):</Text>
        </Static>
    </AlphaNumeric>
    <AlphaNumeric type="AlphaNum.V1">
        <Name>TEXT_6</Name>
        <ID>6</ID>
        <Geometry>
            <X>250</X>
            <Y>2750</Y>
            <Rotation>0</Rotation>
        </Geometry>
        <FieldColor>BLACK</FieldColor>
        <Logged>false</Logged>
        <Text type="TextBased.V1">
            <Inverted>false</Inverted>
            <OverlayMode>MERGE</OverlayMode>
            <Font type="Font.V1">
                <Typeface>Arial</Typeface>
                <CharHeight>400</CharHeight>
                <CharWidth>112</CharWidth>
                <Filename/>
            </Font>
        </Text>
        <Static type="StaticSrc.V1">
            <AppInfo>
                <PropertyBag type="PropertyBag.V1">
                    <Item>
```

FIG. 7E

```xml
                    <Key>DataSource.PerJobData</Key>
                    <Value type="PerJobData.V1">
                        <PropertyMap/>
                    </Value>
                </Item>
            </PropertyBag>
        </AppInfo>
        <Text>Machine Code:</Text>
    </Static>
</AlphaNumeric>
<AlphaNumeric type="AlphaNum.V1">
    <Name>TEXT_7</Name>
    <ID>7</ID>
    <Geometry>
        <X>250</X>
        <Y>3750</Y>
        <Rotation>0</Rotation>
    </Geometry>
    <FieldColor>BLACK</FieldColor>
    <Logged>false</Logged>
    <Text type="TextBased.V1">
        <Inverted>false</Inverted>
        <OverlayMode>MERGE</OverlayMode>
        <Font type="Font.V1">
            <Typeface>Arial</Typeface>
            <CharHeight>400</CharHeight>
            <CharWidth>204</CharWidth>
            <Filename/>
        </Font>
    </Text>
    <Static type="StaticSrc.V1">
        <AppInfo>
            <PropertyBag type="PropertyBag.V1">
                <Item>
                    <Key>DataSource.PerJobData</Key>
                    <Value type="PerJobData.V1">
                        <PropertyMap/>
                    </Value>
                </Item>
            </PropertyBag>
        </AppInfo>
        <Text>Merged Field:</Text>
    </Static>
```

FIG. 7F

```xml
      </AlphaNumeric>
      <AlphaNumeric type="AlphaNum.V1">
        <Name>TEXT_8</Name>
        <ID>8</ID>
        <Geometry>
          <X>2500</X>
          <Y>3750</Y>
          <Rotation>0</Rotation>
        </Geometry>
        <FieldColor>BLACK</FieldColor>
        <Logged>false</Logged>
        <Text type="TextBased.V1">
          <Inverted>false</Inverted>
          <OverlayMode>MERGE</OverlayMode>
          <Font type="Font.V1">
            <Typeface>Arial</Typeface>
            <CharHeight>501</CharHeight>
            <CharWidth>200</CharWidth>
            <Filename/>
          </Font>
        </Text>
        <Merged type="MergedSrc.V1">
          <AppInfo>
            <PropertyBag type="PropertyBag.V1">
              <Item>
                <Key>DataSource.PerJobData</Key>
                <Value type="PerJobData.V1">
                  <PropertyMap/>
                </Value>
              </Item>
            </PropertyBag>
          </AppInfo>
          <SubField>
            <FieldID>4</FieldID>
            <StartIndex>0</StartIndex>
            <Length>0</Length>
          </SubField>
          <SubField>
            <FieldID>2</FieldID>
            <StartIndex>0</StartIndex>
            <Length>0</Length>
          </SubField>
        </Merged>
```

FIG. 7G

```xml
      </AlphaNumeric>
      <AlphaNumeric type="AlphaNum.V1">
        <Name>CODE_39_1</Name>
        <ID>9</ID>
        <Geometry>
          <X>2750</X>
          <Y>4750</Y>
          <Rotation>0</Rotation>
        </Geometry>
        <FieldColor>BLACK</FieldColor>
        <Logged>false</Logged>
        <Code39 type="Code39.V1">
          <Inverted>false</Inverted>
          <OverlayMode>MERGE</OverlayMode>
          <BarHeight>750</BarHeight>
          <QuietMargin>false</QuietMargin>
          <NarrowBarWidth>8</NarrowBarWidth>
          <AutoCheckDigit>false</AutoCheckDigit>
          <TextDisplayOptions>DISPLAY_DATA</TextDisplayOptions>
        </Code39>
        <Static type="StaticSrc.V1">
          <AppInfo>
            <PropertyBag type="PropertyBag.V1">
              <Item>
                <Key>DataSource.PerJobData</Key>
                <Value type="PerJobData.V1">
                  <PropertyMap/>
                </Value>
              </Item>
            </PropertyBag>
          </AppInfo>
          <Text>01234567S</Text>
        </Static>
      </AlphaNumeric>
      <AlphaNumeric type="AlphaNum.V1">
        <Name>TEXT_9</Name>
        <ID>10</ID>
        <Geometry>
          <X>250</X>
          <Y>4750</Y>
          <Rotation>0</Rotation>
        </Geometry>
        <FieldColor>BLACK</FieldColor>
```

FIG. 7H

```xml
        <Logged>false</Logged>
        <Text type="TextBased.V1">
          <Inverted>false</Inverted>
          <OverlayMode>MERGE</OverlayMode>
          <Font type="Font.V1">
            <Typeface>Arial</Typeface>
            <CharHeight>501</CharHeight>
            <CharWidth>200</CharWidth>
            <Filename/>
          </Font>
        </Text>
        <Static type="StaticSrc.V1">
          <AppInfo>
            <PropertyBag type="PropertyBag.V1">
              <Item>
                <Key>DataSource.PerJobData</Key>
                <Value type="PerJobData.V1">
                  <PropertyMap/>
                </Value>
              </Item>
            </PropertyBag>
          </AppInfo>
          <Text>Code 39:</Text>
        </Static>
      </AlphaNumeric>
   </FieldList>
   <AppInfo>
      <PropertyBag type="ImagePropertyBag.V1">
        <RemotingMap type="RemotingInfoList.V1">
          <RemotingLinks/>
        </RemotingMap>
      </PropertyBag>
   </AppInfo>
</Legend>
```

FIG. 71

DYNAMIC MARKING SYSTEM

BACKGROUND

This invention relates to automatic product marking.

Automatic marking is used in production facilities, for example, to mark individual consumer units, boxes of units for delivery (dispatch units), as well as whole pallets of boxes (pallet units). Automatic marking can include such functions as marking the units with production and expiry dates, product bar code, measured unit weights, etc. For example, in a candy bar factory, the wrapping for individual candy bars may be marked with the manufacturing date, an expiry date, and an identification of the plant and line on which the candy bar was produced. Similarly, cases of candy bars may be similarly marked. Pallets of various candy bars may be marked according to their intended destination, as well as by the content of the pallet.

Products are increasingly being marked with information that is more specific. For example, the weight of individual food packages may be marked on each package or specific serial numbers may be assigned to individual packages. For example, a unit of cheese may be marked with the individual weight of the package. There is a need to be able to control and record the markings on the units to allow them to be tracked and to integrate the markings with other systems, such as inventory control systems and warehousing applications.

The markings on a product may be applied to pre-printed packaging, such as to cardboard boxes or foil wrappers, or may be applied to labels, which are then applied to the unit. Increasingly, the markings also include radio-frequency-identification tags (RFID tags), for example, that include specific identifying information for each unit that is tagged.

SUMMARY

In one aspect, in general, the invention features a method and associated software and a system for package marking. A specification of an image is received. The specification includes specifications of data fields for marking on a package. Data values for the data fields are received from multiple data sources. Images are formed based on the received data values and the specification of the image.

Aspects of the invention may include one or more of the following features.

The data sources can include machine settings of a marking device, a sensor for measuring characteristics of packages to be marked, and streaming data providing data specific to individual packages to be marked. The data sources can also include an arithmetic data source that computes a data value for a data field from one or more other values.

The steps of receiving the specification, receiving the data values, and forming the labels can all be performed at a marking device. The marking device can be deployed in a production facility.

The received specification and at least some of the received data values can be provided by a control system remote from the marking device. At least some of the data values can be provided without passing through the control system.

In another aspect, in general, the invention features a method for configuring a marking device. A specification of device-specific characteristics from the marking device. A user interface for configuring the marking device based on the received specification is presented, and device settings for the marking device are determined using the user interface. The marking device is then configured using the determined device settings. The device-specific characteristics include settable parameters for the device, statistics available for reporting by the device, and diagnostics available for the device.

An advantage provided by certain aspects of the invention is that high-speed labeling is achieved by distributing the assembly process of data for marking on units to individual marking devices. Streaming data to the marking devices rather than relying on separate requests from the marking device for each unit also provides potentially increased speed of marking.

An advantage of having the marking device provide a specification of device-specific characteristics, such as settable parameters, is that controlling software does not have to be changed as new parameters, statistics or diagnostics are introduced into the marking devices.

Other features and advantages of the invention are apparent from the following description, and from the claims.

DESCRIPTION OF DRAWINGS

FIGS. 7A-7I are an XML image specification corresponding to the label of FIG. 6.

DESCRIPTION

Figure 1:
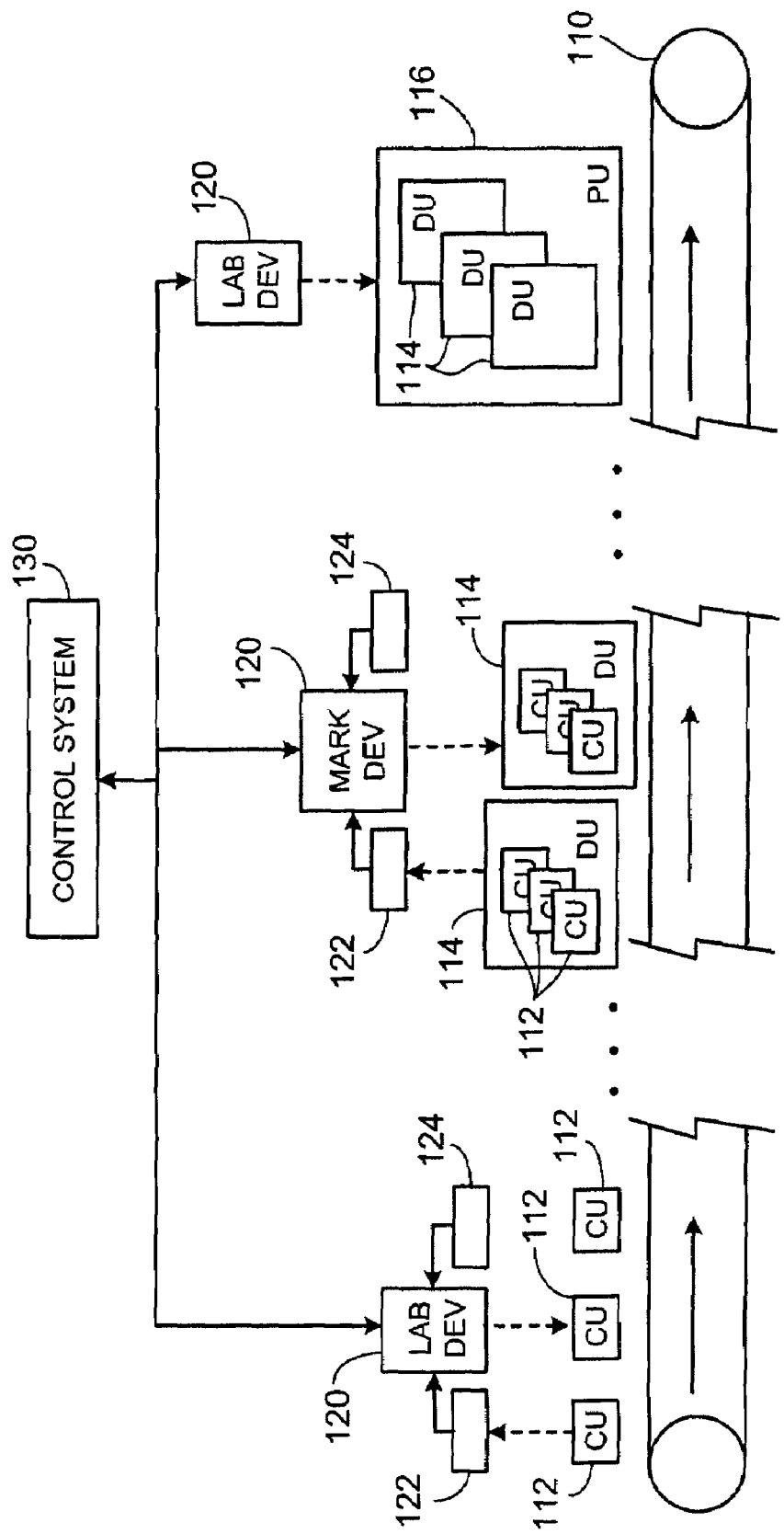
FIG. 1 is a diagram that illustrates a marking system for a production facility.

Referring to FIG. 1, a production facility includes a number of production lines on which various types of units are packaged and marked. Marking (which is sometimes also referred to as "coding") can involve making visible marks directly on pre-printed packaging, for example, using thermal, laser, or ink-jet printing techniques to marking cardboard or film packaging. Marking a unit can also involve marking a separate label or tag (e.g., an RFID tag), and then affixing the label or tag to the unit.

As a representative example of such a facility, a production line 110 includes a section in which consumer units 112 are packaged and marked. A marking device 120 prints on pre-printed packaging or on labels that are used to mark each of the units. For example, in the case of a candy bar, the marking device 120 may print on a reserved (e.g., white background) portion of a pre-printed film wrapper in which then candy bar is wrapped. The marking device is able to add specific information for the consumer unit, for example, a product barcode, a packaging date, an expiry date, and encoded information identifying the production facility, specific production line, and shift within the day. For some types of consumer units, a sensor such as a barcode scanner, RFID reader, or scale, is used to extract information about a consumer unit, and that information is passed to the marking device to modify the marking to be added to the device. For example, a weight of the unit may be printed on the packaging for the unit. Another sensor 124 can be used to verify information marked on the unit after it has passed by the marking unit. For example, a barcode scanner can be used to determine whether the printing of a barcode was performed successfully. The information printed by the marking device as well as the result of this post-scanning can be logged, for example, to keep track of the which markings were successful, and can also be used to control the production line, for example, rejecting specific units that are improperly marked or by shutting down the line (for example, if the printer is not successfully printing barcodes on the units). Another example of post-scanning might be the reading of RFID tag identifiers, and logging those identifiers for populating a database that associates the identifiers with characteristics of the units (e.g., what kind of candy bar).

The marking process may occur at a number of different points in a production facility. As described above, individual consumer units 112 may be labeled. For example, 200-600 units per minute may be processed by a marking device for consumer units. Consumer units may be packaged into dispatch units. For example, candy bars may be arranged into boxes. The boxes may also be labeled, for example, by printing directly on the outside of the box, or affixing a label that is printed for the box. For example, 10-50 boxes per minute may be processed on a production line. Similarly, various distribution units may be assembled onto a palette, for example, for shipment to a particular customer. Again, the palettes themselves may be labeled, for example, with printed labels or RFID tags that are attached to the wrapped palette. For example, 1-5 pallets may be processed per minute on a line.

In some versions of the system, a control system 130 controls the operation of the marking devices 120. In such a system, each marking device 120 is linked to the control system 130 by a communication link, such as serial communication link. Alternatively, the marking devices 120 and the control system 130 are all linked over a communication network, such as a local or wide are data communication network (e.g., Ethernet). In other versions of the system, each of the marking devices can be individually configured without the use of a centralized control system. For example, each marking device provides a screen-based interface that allows an operator to configure the device. In addition, data, such as specifications of the images to be marked on the units, may be provided from external sources for example on removable data media.

Figure 2:
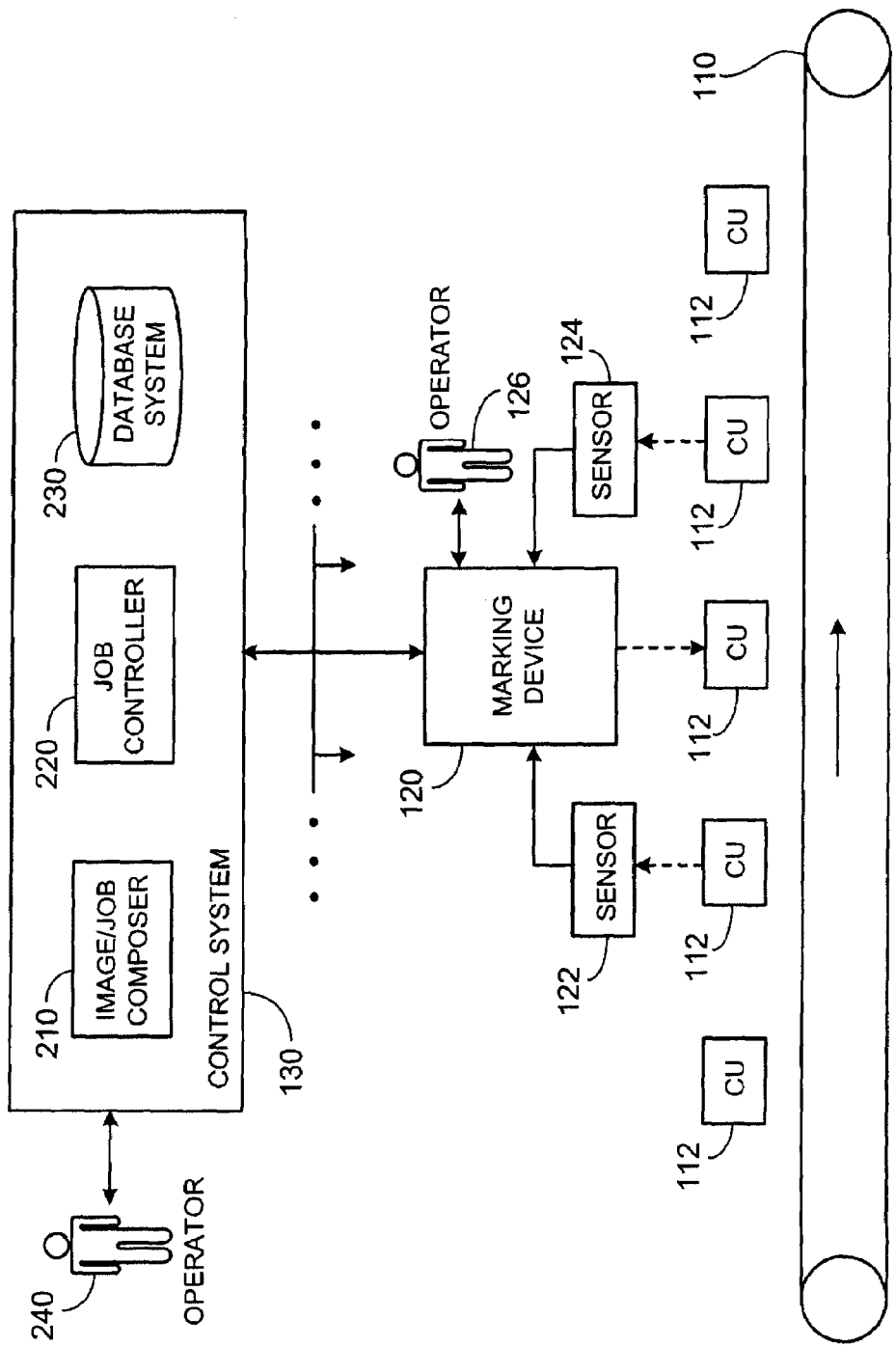
FIG. 2 is a diagram that illustrates a portion of the marking system.

Referring to FIG. 2, an operator 126 is able to configure certain aspects of the marking device 120. For example, a number of parameters may be set at the time a device is installed in a production facility or by the operator on the floor of the production facility, such as an identifier of the specific production line, and those parameters can affect the specific markings that are produced by the marking device. For example, an identifier of the production line, which is then marked on the units processed by the marking device, may be set at the time the device in installed. As another example, the operator 126 may adjust the location (e.g., registration) of the printing and print characteristics such as the darkness of the printing before the start of a job or as an adjustment during a production run.

The control system 130 also accepts inputs from one or more operators. For example, an operator 240 can make use of an image/job composer 210 to specify characteristics of a marking job. The characteristics can include the graphic design of a label or wrapper, and include specifications of the information and its placement and format on the label or wrapper. For example, the location of a production date as well as its format, type face and size, etc. is specified by the operator. A job controller 220 coordinates the marking process, for example, providing information to the marking devices 120 during a production run for use in marking the units. A database 230 includes information that is used to determine the information that is marked on the units, or to hold information recoding the marking of produced units.

Figure 3:
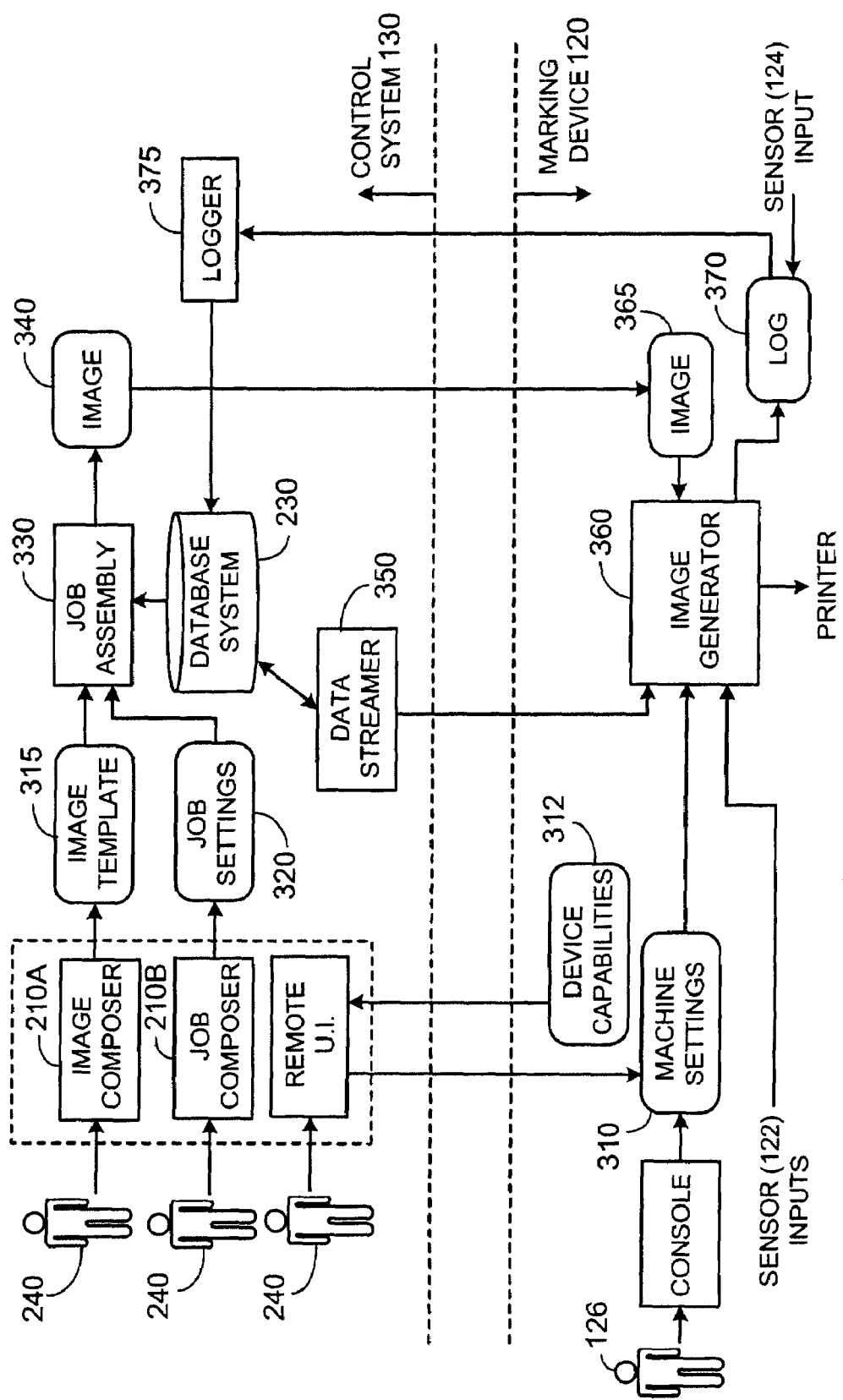
FIG. 3 is a data flow diagram for generation of markings for a unit.

Referring to FIG. 3, the process of controlling the images generated by a printer in the marking device 130 makes use of information from a number of different sources. An operator 240 uses an image compose to specify an image template 315, which includes a design for a label or wrapper, but is not necessarily specific to a particular product. For example, the labels for boxes of chocolate bars may be largely the same for different types of chocolate bars. For a particular production run, the operator 240 specifies job settings 320, include specify some of the values that are unspecified in the image template. An example of such a value is the product name. A job assembly component 330 combines the image template and the jobs settings 320 to form an image 340, which is a data specification of what it to be printed on the label or wrapper of the unit on the production line. The job assembly component can make use of the database system 230, for example, to obtain product information based on a product code specified in the jobs settings 320. Note that the image 340 in general includes specification of data fields the values of which are not yet specified at that point. For example, fields corresponding to the date, the identifier of the production line, an RFID tag identifier, etc. are represented as data items.

At the marking device, an operator 126 uses a console to set machine settings 310 for the marking device 120. For example, a machine setting can include data such as an identifier of a production line, and can include settings related to the printing process, such as a darkness setting for a printer. An operator 240 at the control system can alternatively remotely set machine parameters for the marking device. In order to accommodate new parameters without having to update the software in the control system, the marking device provides device capabilities 312 to the control system. The device capabilities 312 is a file that identifies parameters, documentation of the use of the parameters, rules that determine in which modes various parameters are application, and allowable values or ranges of values for the parameters. A remote user interface component in the control system presents a user interface to the operator, who sets the machine parameters. The machine settings are then sent from the control system to the marking device, thereby avoiding the need for the operator to physically go to the marking device.

The image 340 is transferred over the communication link coupling the control system to the marking device and stored as an image 365 in the memory of the marking device. An image generator component 360 of the marking device uses the transferred image 365 as well as other information to drive a printer that produces the labels or wrappers for the units being produced on the production line. The image generator 360 can make use of information that is not particularly specified in the image 365. For example, data from the machine settings 310 can be combines with the image 365 to drive the printing of the labels.

In addition to relatively static information that is encoded in the image 365 or is static or generated at the marking device, the image generator can make use of data that is passed from the control system. An example of such data is a series of serial numbers that are to be marked on sequential units on the production line. In order to avoid a need to request the information for each unit in turn, and thereby potentially limiting a speed of the production line based on the responsiveness of the control system, the information is streamed to the marking device ahead of when it is needed. For example, serial numbers can be provided to the marking device in batches, on request from the marking device, or the serial numbers may be streamed without solicitation to the marking device. The image generator then combines the inbound streamed information with the image 365 to make each label, which in such a case is generally unique to each unit.

An example of use of streaming data is marking of contest information on units. For example, a marking may be made on each unit (e.g., inside the wrapper) that indicates whether that unit is a "winner." In such applications, it may be important to carefully control which markings are made, for example, to make sure that there is only a single winner and to keep track of the distribution of the winning unit.

In addition to using data streamed from the control system, the marking device makes use of data from a sensor 122 to complete the marking specified by the image 365. For example, the image may specify that a data item be obtained from the sensor for marking on a unit. An example is a weight sensor that provides the weight of each unit to the marking device, and this weight is provided to the image generator, which places that weight information into the label as specified by the image 365 for the units. In addition to specifying the source of data for the various fields, the image 365 may specify how the data is to be manipulated. For example, for numerical data, an arithmetic transformation may be specified. Such a transformation can be used to mark a price based on a weight (e.g., based on a price per pound) or to mark the weight in different units (e.g., grams versus ounces). For date fields, the image can specify the format of the date, such as the order and representation of the day, month, and year portions of the date. These types of marking can be used to weigh packages of cheese and mark the package with the weight in desired units, a price at a desired price and currency, and an expiry date in a desired format.

The image generator 260 generates a log 370, which may also include information from a sensor 124, such as a post-marking scanner. The log stores information that identifies the specific data that is marked on the units. For example, when the marking device uses data, such as machine settings, internally generated serial numbers, sensed characteristics of the units (e.g., weight), or data streamed from the control system, the log provides information that allows the specific values on each unit to be recorded and then uploaded to a logger component 375 at the control system.

Figure 4:
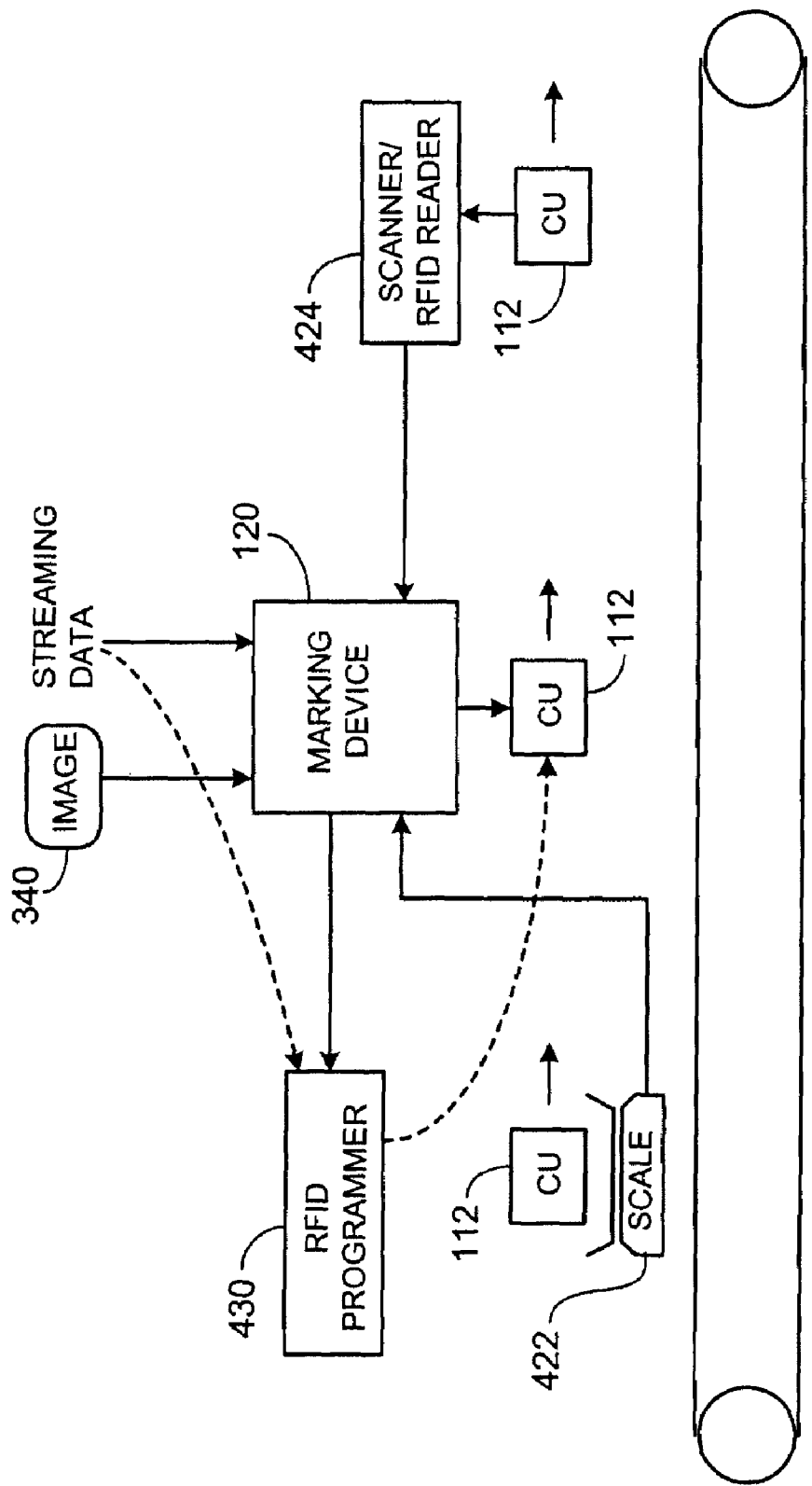
FIG. 4 is a diagram of an example of a marking device.
Figure 5:
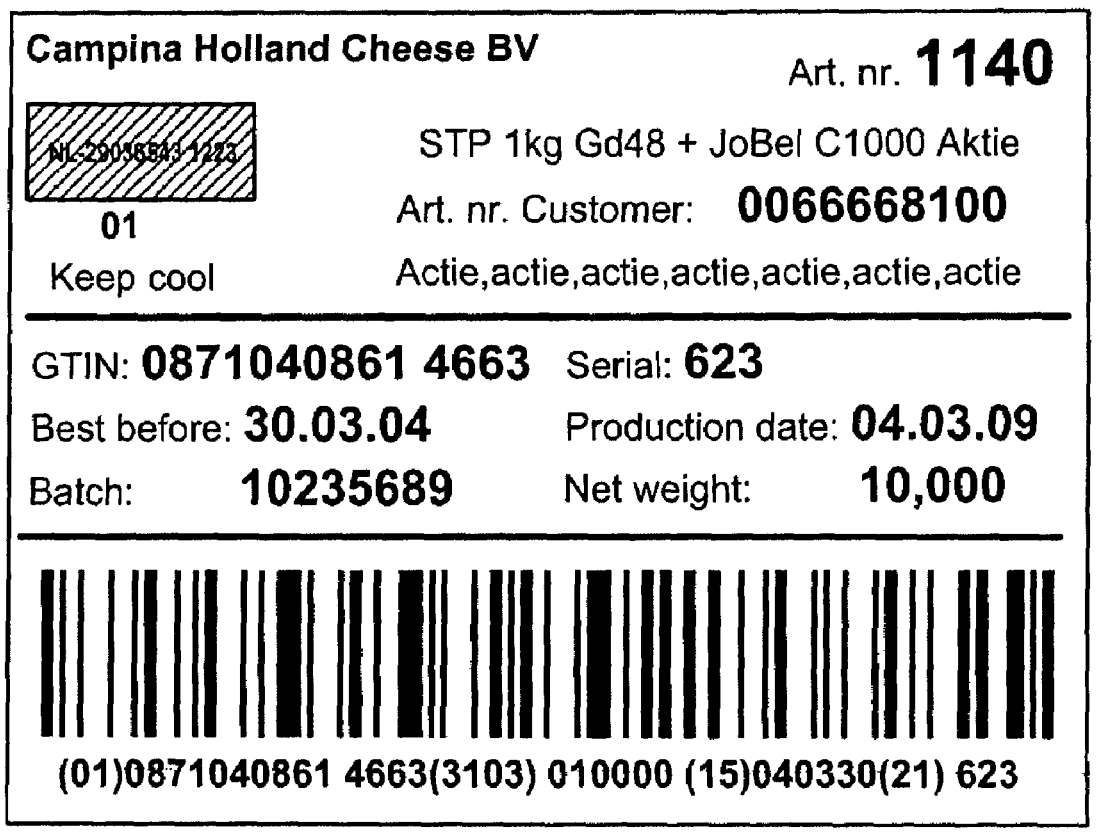
FIG. 5 is an image of a label.

Referring to FIG. 4, as an example of the process illustrated in FIG. 3. FIG. 5 shows an example of a label that is produced by such a process. Consumer units, such as an individually wrapped food product (e.g., packages of cheese), are marked according to a image 340 which specifies which information is to be marked on the units and the placement and format of that marking. In this example, determining the information for marking the unit involves each unit 112 being weighed by a scale 422. The weight is provided directly to the marking device 120, for example, over a serial communication interface using a text data format. In this example, an RFID tag is affixed to each unit, and the control system streams batches of serial numbers to an RFID programmer 430 either via the marking device 120 or directly to the programmer 430. The control system also streams other data, such as serial numbers to the marking device 120 for printing on the unit. As the unit 112 passes the device, the printer in the device 120 marks the packaging for the unit and affixes the programmed RFID tag. The information marked or tagged on the unit is logged and the log is streamed or periodically uploaded to the control system. Optionally, a scanner or RFID reader 424 scans the units after they have been marked, and this information is logged and uploaded to the control system.

Figure 6:
FIG. 6 is an image of a label.

In one implementation of the system and the dataflow illustrated in FIG. 3, various of the intermediate files make use of XML (extensible Markup Language) documents and associated schema or document definitions. For example, the image template 315, job settings 320, and image 340 are stored as XML documents. Similarly, the device capabilities 312 and machine settings 310 are also stored and transmitted as XML documents. In the case of the image files, the elements of the XML file can represent separate graphical elements, such as images or generated graphics with the specification or source of the element being included in the XML file. Data elements (e.g., serial numbers, weights, dates) can include a specification of the source of the data, for example, by an identifier, as well as a format specification for rendering the data. The specification can also include expressions for computing data items, for example, using an arithmetic expression to compute a derived quantify (e.g., a price based on a weight and a price per unit weight). Referring to FIG. 6 and example of a label corresponds to an XML-specified image shown in FIGS. 7A-7I.

In an alternative approach, the image specification may include specification of procedural elements (e.g., executable statements, scripts, macros, etc.) that are used to determine markings at production time. For example, including procedural statements that are executed at the marking device. In another implementation of the system, the image data can include more of the packaging image itself. With adequate printing technology, the entire packaging may be printed by the marking device rather that using pre-printed packaging with reserved portions for use by the marking device. Other data formats than XML can alternatively be used. For example, an image specification based on a printer description language such as Postscript or Printer Control Language (PCL) (suitably extended to allow for insertion of data items such as at the marking device) or based on a markup language such as HTML can alternatively be used.

Communication between various components of the control system, and between the control system and the marking devices optionally makes use of a web services (".NET") approach in which components and devices are implemented as services that receive requests with XML-encoded data and provide responses with similarly encoded data. In some versions of the system, various of the communication between components makes use of SOAP-based encapsulation of the requests and responses, allowing the components to be geographically distributed, and separated by security firewalls.

Versions of the system can be implemented in software or in hardware, or using a combination of software or hardware. The software can include instructions (e.g., program language statements in a compiled or interpreted language, machine instructions, or byte codes for a virtual machine) for execution of general-purpose or special purpose computers. The software may be provided on computer-readable media (e.g., optical or magnetic disks) or provided over a data channel (e.g., on a data signal propagated over a data network). By way of example, the marking devices can include special-purpose computers that execute a real-time operating system, and the control system can include general-purpose computers (e.g., personal computers) that host various software components of the system.

It is to be understood that the foregoing description is intended to illustrate and not to limit the scope of the invention, which is defined by the scope of the appended claims. Other embodiments are within the scope of the following claims.

What is claimed is:

1. A method for execution by a marking device for marking a package, the method comprising:

receiving, at the marking device, a specification of an image, the specification including specifications of a plurality of data fields;

at the marking device, receiving, from a plurality of data sources, data values for the plurality of data fields, each of the data fields storing data values representative of corresponding information to be marked on a package; and at the marking device, forming the image based on each of the received data values form the plurality of data sources and the specification of the image.

2. The method of claim 1, further comprising selecting the data sources from the group consisting of a source of machine settings of the marking device, a source of instructions for execution by the marking device, a sensor for measuring characteristics of a package to be marked, and a source of streaming data, the streaming data including data representing information specific to individual packages to be marked.

3. The method of claim 1, further comprising selecting at least one of the data sources to include an arithmetic data source that computes, from a set of input values, the data values for the data fields.

4. The method of claim 1, wherein the steps are performed at a marking device that is deployed in a production facility.

5. The method of claim 1, wherein receiving the received specification of an image comprises receiving data from a control system remote from the marking device.

6. The method of claim 5, wherein receiving of the data values for the data fields comprises receiving data provided without passing through the control system.

7. A method for remotely configuring a marking device, the method comprising:

at a location remote from the marking device, receiving, from the marking device, a specification of device-specific characteristics;

presenting a user-interface for configuring the marking device based on the received specification of device-specification characteristics, receiving, from the user-interface, instructions for determining device settings for the marking device; and causing the marking device to be configured using the determined device settings.

8. The method of claim 7, wherein receiving a specification of device-specific characteristics comprises receiving settable parameters for the device.

9. The method of claim 7, wherein receiving a specification of device-specific characteristics comprises receiving statistic available for reporting by the device.

10. The method of claim 7, wherein receiving a specification of device-specific characteristics comprises receiving available diagnostic information device.

11. A marking device comprising:

a storage medium for a specification of an image, the specification including specifications of a plurality of data fields;

a plurality of interfaces for receiving, from the plurality of data sources, data values for the plurality of data fields, each of the data fields storing data values representative of corresponding information to be marked on a package; and an image generator configured to form the image based on each of the received data values form the plurality of data sources and the specification of the image.

12. A system for package marking, the system comprising printing means including:

means for receiving a specification of an image, the specification including specifications of plurality of data fields;

means for receiving, from a plurality of data source, data values for the data plurality of fields, each of the data field storing data values representative of information to be marked on a package; and means for forming the image based on each of the received data values form the plurality of data sources and the specification of the image.

13. Computer-readable media having encoded thereon software for execution by a marking device for marking a package, the software comprising instructions for causing a marking device to:

receive a specification of an image, the specification including specifications of a plurality of data fields;

receive, from a plurality of data sources, data values for the plurality of data fields, each of the data fields storing data values representative of corresponding information to be marked on a package; and form the image based on each of the received data values form the plurality of data sources and the specification of the image.

14. The method of claim 1, wherein receiving data values comprises receiving data from a control system remote from the marking device.

* * * * *

UNITED STATES PATENT AND TRADEMARK OFFICE
CERTIFICATE OF CORRECTION

| | |
|---|---|
| PATENT NO. | : 7,460,921 B2 |
| APPLICATION NO. | : 10/951418 |
| DATED | : December 2, 2008 |
| INVENTOR(S) | : Chris Sullivan |

It is certified that error appears in the above-identified patent and that said Letters Patent is hereby corrected as shown below:

In column 4, line 6, delete "compose" and insert --composer--, therefor.

In column 4, line 16, delete "it" and insert --is--, therefor.

In column 7, line 32, Claim 6, after "receiving data" insert --values--.

In column 7, line 37, Claim 7, delete "receiving,from" and insert --receiving, from--, therefor.

In column 7, lines 40-41, Claim 7, delete "device-specification" and insert --device-specific--, therefor.

In column 8, lines 2-3, Claim 9, delete "statistic" and insert --statistics--, therefor.

In column 8, line 6, Claim 10, after "information" insert --for the--.

In column 8, line 8, Claim 11, after "for" insert --storing--.

In column 8, line 11, Claim 11, after "from" delete "the" and insert --a--, therefor.

In column 8, line 22, Claim 12, after "specifications of" insert --a--.

In column 8, line 24, Claim 12, delete "source," and insert --sources,--, therefor.

In column 8, line 25, Claim 12, after "for the" delete "data".

In column 8, line 25, Claim 12, after "plurality of" insert --data--.

UNITED STATES PATENT AND TRADEMARK OFFICE
CERTIFICATE OF CORRECTION

PATENT NO. : 7,460,921 B2
APPLICATION NO. : 10/951418
DATED : December 2, 2008
INVENTOR(S) : Chris Sullivan It is certified that error appears in the above-identified patent and that said Letters Patent is hereby corrected as shown below:

In column 8, line 26, Claim 12, delete "field" and insert --fields--, therefor.

Signed and Sealed this

Twenty-fourth Day of February, 2009

JOHN DOLL
*Acting Director of the United States Patent and Trademark Office*